Sept. 20, 1971 I. G. MEIKLEJOHN 3,606,474
WHEELS
Filed June 30, 1969 3 Sheets-Sheet 1

Inventor
IAN G. MEIKLEJOHN
By
Mason, Fenwick & Lawrence
Attorneys

Sept. 20, 1971                I. G. MEIKLEJOHN                3,606,474
                                    WHEELS
Filed June 30, 1969                                        3 Sheets-Sheet 2
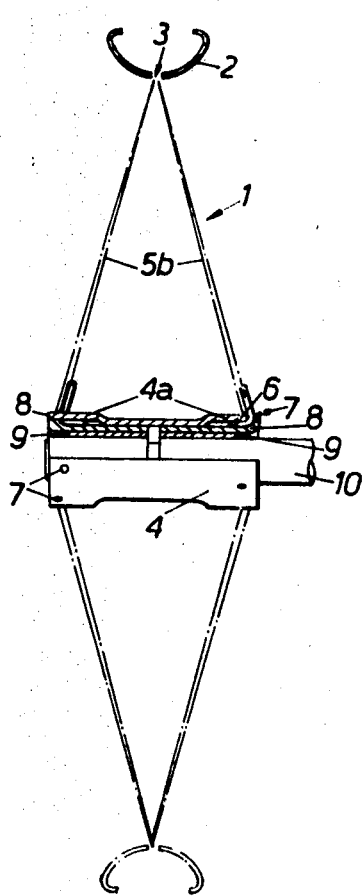
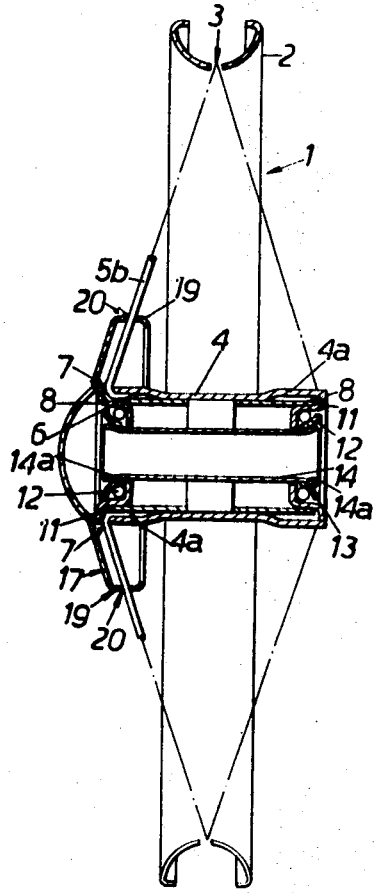
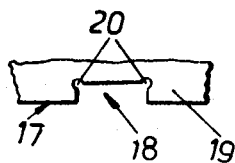
Inventor
IAN G. MEIKLEJOHN
By
Mason, Fenwick & Lawrence
Attorneys

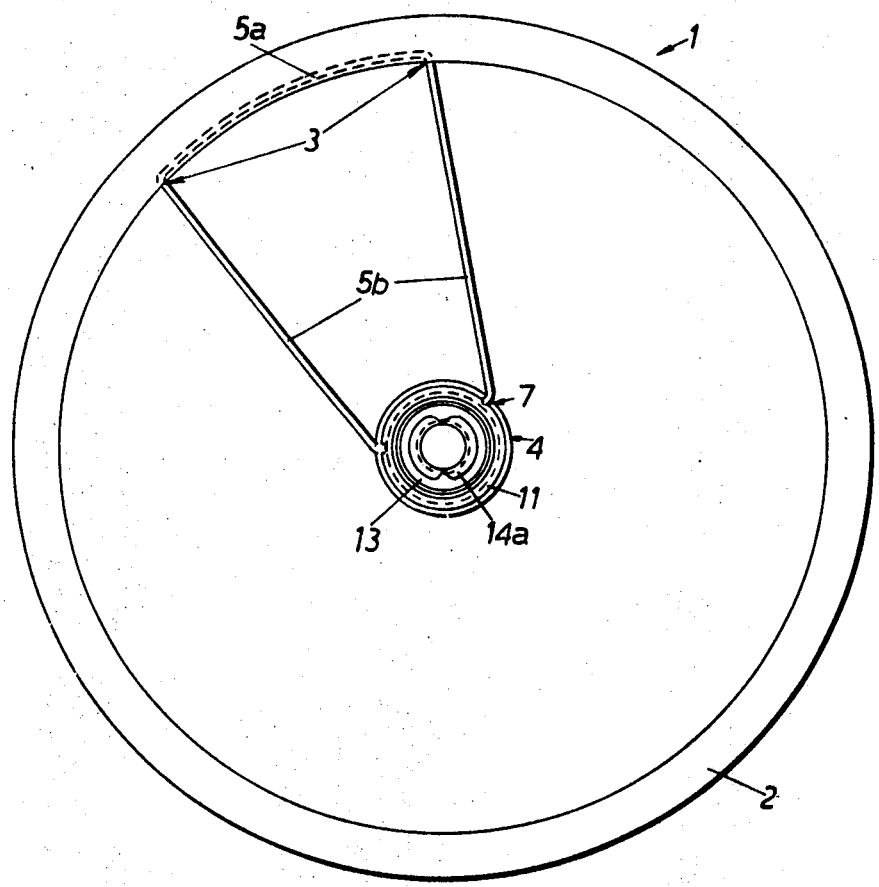

United States Patent Office 3,606,474
Patented Sept. 20, 1971

3,606,474
WHEELS
Ian G. Meiklejohn, Kirkcaldy, Fife, Scotland, assignor to I. G. Meiklejohn & Company Limited, Kirkcaldy, Fife, Scotland
Filed June 30, 1969, Ser. No. 837,515
Claims priority, application Great Britain, July 3, 1968, 31,815/68
Int. Cl. B60b 1/04
U.S. Cl. 301—60    9 Claims

ABSTRACT OF THE DISCLOSURE

A wire-spoked wheel of the type used on perambulators, golf caddie carts, cycles and the like, wherein a plurality of wire spokes engage a rim and extend substantially radially to an axle bearing assembly comprising a hub tube and sleeving within the hub tube, the inner end portions of the spokes being received in apertures in the hub tube and having axial portions anchored between the sleeving and the hub tube so that the rim is rigidly supported on the axle bearing assembly, the construction obviating the need for threaded nipples engaging the rim and the spokes.

---

This invention concerns improvements in or relating to wire-spoked wheels.

The conventional wire-spoked wheel consists of a large number of headed spokes usually in multiples of four essentially radiating from both ends of a hub to the rim. The spokes are attached to flanges on the hub by threading them through holes in said flanges so that each head co-operates with the respective flange, and to the rim by nipples which extend through corresponding holes in the rim and which are screwed on to the spokes. Each nipple requires to be adjusted individually to achieve concentric running of the wheel. There are thus a large number of parts required, which results in considerable labour in manufacture and assembly.

An object of the present invention is to obviate or mitigate disadvantages at present inherent in the manufacture and assembly of wire-spoked wheels.

According to the present invention there is provided a wire-spoked wheel including a rim, an axle bearing assembly comprising a hub tube and sleeving within the hub tube, and a plurality of wire spokes engaging the rim and extending substantially radially between the rim and the axle bearing assembly, the inner end portions of the spokes penetrating apertures in the hub tube and having axial portions anchored between the sleeving and the hub tube so that the rim is rigidly supported on the axle bearing assembly.

Further according to the present invention there is provided a method of manufacturing a wire-spoked wheel comprising engaging a plurality of wire spokes with a wheel rim and with a hub tube so that the spokes extend substantially radially therebetween with the inner end portions of the spokes protruding into the bore of the hub tube, and bending the said inner end portions inwards by forcing a pair of sleeves respectively into opposite ends of the hub tube to form inwardly bent axial portions and thereby anchor and tension the spokes.

An embodiment of the present invention will now be described merely by way of example, with reference to the accompanying drawings, in which:

FIG. 2 is a diagrammatic cross-sectional view, partly in section, of the wheel shown in FIG. 1;

FIG. 3 is a diagrammatic cross-sectional view of a spoked wheel having a ball-bearing axle mounting;

FIG. 4 is an elevation of the wheel of FIG. 3, showing only one spoke, for clarity; and FIG. 5 is a detail of a hub cap for use with the wheels of FIGS. 1, 2, 3 and 4.

Figure 1:
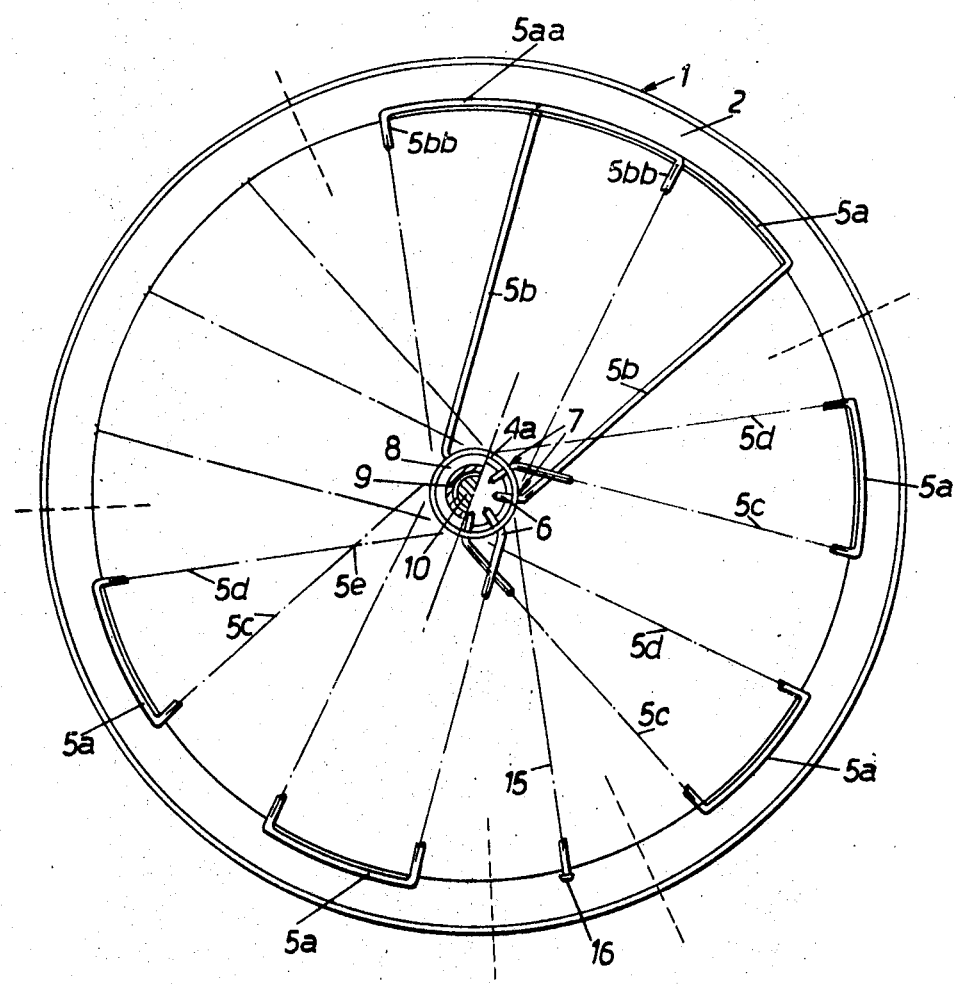
FIG. 1 is a diagrammatic view showing a spoked wheel, the drawing being used, for simplicity, to illustrate a number of different spoke arrangements.

Referring to the drawings, and more particularly to FIGS. 1 and 2, a wire-spoked wheel 1 is assembled from a channel-section rim 2 having sixteen equally spaced radially disposed holes 3, a hub member in the form of a hub tube 4 having an enlarged-diameter portion 4a at each end, and eight double spokes each comprising two limbs 5b joined together by a curved portion 5a having a radius of curvature corresponding substantially to that of the rim 2, and an angled tail 6 on each limb 5b. The limbs 5b of each spoke pass through alternate holes 3 in the rim 2, and extend to the hub tube 4 where the tail 6 of each limb 5b is received in an aperture 7 in one of the enlarged-diameter portions 4a and projects radially into the bore of the hub tube 4. The curved portion 5a of each double spoke is bowed slightly to allow a limb 5bb of an adjacent double spoke to pass through the hole 3 in the rim 2 by-passed by each other spoke, approximately half the length of each curved portion 5a being overlapped by approximately half the length of the curved portion 5aa of the adjacent spoke. An insert in the form of a sleeve 8 is then force-fitted through each open end of the hub tube 4 and in its passage into the bore of the hub tube 4 bends the tail 6 of each limb 5b, 5bb axially inwards so that the axial tail is firmly anchored between the sleeve 8 and the enlarged diameter portion 4a. The limbs 5b, 5bb are subjected to a substantially equal tension by this method of anchoring, and also to a torsional effect. A bush 9 of nylon, or other material suitable for a bearing, for example polytetrafluoroethylene, is inserted into the bore of the sleeve 8 to carry an axle or stub shaft 6. In this embodiment, the two limbs 5b of a first double spoke are received in apertures 7 at one end of the hub tube 4, the limbs 5bb of an adjacent spoke in the other end of the hub tube 4, and so on for alternate spokes, a limb of each spoke crossing a limb of an alternate spoke close to the hub tube.

In a modification, shown in FIGS. 3 and 4, the wheel 1 consists of a rim 2, double spokes inserted through holes 3 in the rim 2 and in the holes 7 in the hub tube 4 in exactly the same manner as in the above embodiment. A sleeve 8 is a press fit into each end of the hub tube 4 so that the tails 6 of the spokes are bent inwards and retained by being pressed between the sleeve 8 and enlarged-diameter portions 4a. Ball race cups 11 are an interference fit with the sleeves 8 and form housings for ball bearings 12. Annular inner cones 13 are held by a split sleeve 14 expanded at each end 14a to retain the whole assembly, a stub shaft or axle (not shown) being carried by the split sleeve 14.

Obviously the arrangement of the spokes can be modified; for example, as shown in FIG. 1, one limb 5c of each double spoke could pass to one end of the hub tube 4 and the other limb 5d to the other end of the hub tube 4, and the said other limb may, as shown at 5c, or may not cross the direction of the said one limb. In the first case the double spokes are of similar shape, and the second case are of dissimilar shape.

In this example, in both cases the limbs 5c and 5d of each spoke pass through adjacent holes 3 in the rim 2, and the curved portions 5a do not overlap each other inside the rim 2.

Again, it is possible (FIG. 1) to use single spokes 15 each having a head 16 engaging the rim 2 to hold the spoke therein, but in this case no torsional tensioning effect is obtained on assembly because the head is free to rotate. The use of double spokes simplifies assembly and positions the tails 6 accurately, besides resisting torsion and thus increasing spoke tension.

To manufacture the spoked wheels according to the present invention, it is convenient to hold the rim 2 and the hub tube 4 concentrically in a jig and to hold the spokes in position by means of clamps. The sleeves 8 are simultaneously and forceably inserted into the hub tube 4 by means of a press whereby the projecting tails 6 are bent axially inwardly.

The wheel can be retained on an axle or stub shaft by any conventional method such as detents, washers and split pin arrangements, or a spring loaded plunger.

A rubber or other tyre may fitted on the rim as desired.

A hub cap 17 (FIG. 3) may be fitted and one which enagages the spokes has been found particularly suitable. This spoke-engaging hub cap 17 is substantially cup-shaped and is provided with four slots 18 equally spaced around the cap rim 19, each slot 18 being of substantially rectangular shape and having in each corner opposite the open side a substantially semicircular recess 20. The hub cap 17 snaps over the spokes, each of the eight spokes being received in one of the recesses 20.

Although the wheel has been described above as having eight double spokes or sixteen single spokes it will be obvious that more or less spokes may be used depending on the rigidity required in the assembled wheel.

By virtue of the present invention, therefore, there is provided a wire-spoked wheel having a smaller number of parts than those used heretofore with a saving it costs. The method of assembly is much simpler and requires less labour with a further saving in costs.

I claim:

1. A wire-spoked wheel, including a rim having a series of circumferentially spaced holes defined therein, a hub member having open ends and a plurality of circumferentially spaced apertures in each open end; a plurality of wire spokes each comprising two limbs joined together by a curved portion having a radius of curvature corresponding substantially to that of the rim and an angled tail on each limb, the limbs of each spoke passing through alternate holes of the said series and extending to the hub member, the curved portion of each spoke being bowed slightly to permit a limb of an adjacent spoke to pass through the hole in the rim by-passed by each other spoke, the inner end portions of each limb penetrating one of the apertures; and an insert force-fitted ino each open end of the hub member to form an inwardly turned axially directed portion on each inner end to securely anchor the inner end between the respective insert and the inner surface of the open end and to tension the spokes.

2. A wire-spoked wheel according to claim 1, wherein alternate limbs pass to opposite ends of the hub member.

3. A wire-spoked wheel according to claim 1, wherein a pair of adjacent limbs pass to the same end of the hub tube and an adjacent pair of adjacent limbs pass to the other end of the hub tube.

4. A wire-spoked wheel, including a rim having a series of circumferentially spaced holes defined therein; a hub member having open ends and a plurality of circumferentially spaced apertures in each open end; a plurality of wire spokes each comprising two limbs joined together by a curved portion having a radius of curvature corresponding substantially to that of the rim and angled tail on each limb, the limbs of each spoke passing through adjacent holes of the said series and extending to the hub member, the inner end portion of each limb penetrating one of the apertures; and an insert force-fitted into each open end of the hub member to form an inwardly turned axially directed portion on each inner end to securely anchor the inner end between the respective insert and the inner surface of the open end and to tension the spokes.

5. A wire-spoked wheel according to claim 4, wherein a pair of adjacent limbs pass to the same end of the hub member and an adjacent pair of adjacent limbs pass to the other end of the hub member.

6. A wire-spoked wheel according to claim 4, wherein one limb of each spoke passes to one end of the hub member and the other limb of each spoke passes to the other end of the hub member, and the limbs of each spoke cross each other, each spoke being similar in shape.

7. A wire-spoked wheel according to claim 4, wherein one limb of each spoke passes to one end of the hub member and the other limb to the other end of the hub member and the said limbs do not cross each other, adjacent spokes being of dissimilar shape.

8. A wire-spoked wheel, including a rim having a series of circumferentially spaced holes defined therein; a hub member having open ends and a plurality of circumferentially spaced apertures in each open end; a series of spokes each comprising a head of larger diameter than said holes, a limb and an angled tail portion on each limb, the limb of each spoke passing through a hole in the rim and extending to the hub member and the head engaging the rim, the inner end portion of each spoke being received in one of the apertures in the hub member; and an insert force-fitted into each open end of the hub member to form an inwardly turned axially directed portion on each inner end to securely anchor the inner end between the respective insert and the inner surface of the open end and to tension the spokes.

9. A method of manufacturing a wire-spoked wheel, comprising providing a rim having a series of circumferentially spaced holes defined therein, a hub member having open ends and a plurality of apertures in each open end, and two inserts and a plurality of spokes each comprising at least one limb, an angled tail portion on each limb and a rim-engaging portion; passing the limbs of the spokes through the holes in the rim so that the rim-engaging portions engage the rim and the limbs extend towards the centre of curvature of the rim; engaging the angled tail portions in the apertures of the hub member so that the inner end portion of each spoke projects substantially radially into the respective open end; and forcing an insert simultaneously into each open end to end the projecting inner ends of the spokes substantially axially inwards to securely anchor the axially directed portions between the respective inserts and the inner surfaces of the open ends and to tension the spokes.

References Cited
UNITED STATES PATENTS

| | | | |
|---|---|---|---|
| 886,565 | 5/1908 | Williams et al. | 301—57 |
| 1,153,919 | 9/1915 | Hopkins | 301—60 |

FOREIGN PATENTS

| | | | |
|---|---|---|---|
| 493,566 | 2/1950 | Belgium | 301—59 |
| 668,546 | 12/1938 | Germany | 301—60 |

MILTON BUCHLER, Primary Examiner

C. A. RUTLEDGE, Assistant Examiner

U.S. Cl. X.R.

29—159.02